Patented June 25, 1940

2,205,658

UNITED STATES PATENT OFFICE 2,205,658

PRODUCTION OF MAGNESIUM

Roy C. Kirk, Midland, Mich., assignor to The Dow Chemical Company, Midland, Mich., a corporation of Michigan No Drawing. Application September 29, 1939, Serial No. 297,110

4 Claims. (Cl. 75—67)

This invention relates to an improved process for the production of magnesium by the thermal reduction of magnesia-containing material with a carbonaceous reducing agent.

It is known to prepare metallic magnesium by heating magnesia-containing ores with carbonaceous reducing agents at elevated temperatures. In the process the magnesium is liberated as a vapor which is withdrawn from the reduction zone and condensed.

I have now found that this reduction process is apparently catalyzed by the presence of silica in the reduction mixture. That is, the presence of silica greatly increases the rate of evolution of magnesium vapors, thereby permitting a much higher percentage recovery of the magnesium in the ore charge within a given length of time and correspondingly reducing the heating costs in the process.

In practice, the magnesia-containing ore, carbonaceous reducing agent, and silica are mixed and the mixture is heated at a temperature sufficient to liberate the magnesium as vapor, usually at 1400° C. to 1700° C., preferably at 1450° C. to 1600° C. and at a pressure below 25 millimeters of mercury absolute. When temperatures below 1400° C. are used, magnesium evolves only slowly; when temperatures much above 1700° C. are used, the silica added as catalyst itself reacts with the carbonaceous reducing agent to a considerable extent, forming silicon which volatilizes from the reaction zone, thereby destroying the catalyst.

Any magnesia-containing ore such as calcined magnesite, calcined dolomite, or calcined brucite may be employed, and likewise any carbonaceous reducing agent, such as coke, graphite, charcoal, or the like. The carbonaceous reducing agent is usually employed in a quantity approximately equivalent to the magnesia, although a slight excess may sometimes be used. The reduction mixture may advantageously be formed into briquettes prior to the heating operation.

In the process of the invention, the silica should be employed in such a proportion as to constitute between about 5 and 35 per cent by weight of the total charge. If less than about 5 per cent of silica is used, the accelerative effect on the reduction is small, and if much more than about 35 per cent is used the rate of magnesium evolution is actually retarded somewhat. Optimum rate of reaction is obtained when the silica represents 10 to 20 per cent of the charge. The silica may be added as such, or in the form of certain silicates, or may occur naturally in the magnesia-containing ore.

The following example will illustrate the invention but is not to be construed as limiting its scope.

A mixture of 300 parts by weight of finely-divided calcined magnesium oxide, 127 parts of powdered graphite, and 47 parts of finely-divided silica was formed into briquettes with the aid of a tar binder. These briquettes were heated to carbonize the binder, and were then placed in a furnace operating at a temperature of about 1500° C. and at an absolute pressure of 10 millimeters of mercury. The reduction charge was heated at this temperature for 2 hours and the magnesium vapor liberated was withdrawn from the furnace and condensed.

When the experiment just described was duplicated in every respect except that no silica was added to the charge, the recovery of condensed magnesium was only 75 per cent of that in the run using silica.

It is to be understood that the foregoing description is illustrative rather than limitative and that the invention is co-extensive in scope with the following claims:

1. In a process for the production of magnesium by the thermal reduction of magnesia-containing material by means of a carbonaceous reducing agent, the improvement which comprises carrying out the reduction in the presence of silica in a quantity corresponding to between about 5 and about 35 per cent by weight of the total charge, and at a temperature between about 1400° C. and about 1700° C.

2. In a process for the production of magnesium by the thermal reduction of magnesia-containing material by means of a carbonaceous reducing agent, the improvement which comprises carrying out the reduction in the presence of silica in a quantity corresponding to between 10 and 20 per cent by weight of the total charge, and at a temperature between about 1400° C. and about 1700° C.

3. In a process for producing magnesium, the steps which include heating a charge comprising magnesia-containing ore, a carbonaceous reducing agent in a proportion at least chemically equivalent to the magnesia, and silica in a proportion between about 5 and about 35 per cent by weight of the total charge to a temperature between about 1400° C. and about 1700° C. to liberate magnesium as a vapor, and withdrawing the vapor and condensing it.

4. In a process for producing magnesium, the steps which include heating a charge comprising magnesia-containing ore, a carbonaceous reducing agent in a proportion at least chemically equivalent to the magnesia, and silica in a proportion between about 10 and about 20 per cent by weight of the total charge at a temperature between about 1450° C. and about 1600° C. at an absolute pressure below 25 millimeters of mercury to liberate magnesium as a vapor, and withdrawing the vapor and condensing it.

ROY C. KIRK.